Figure 1:
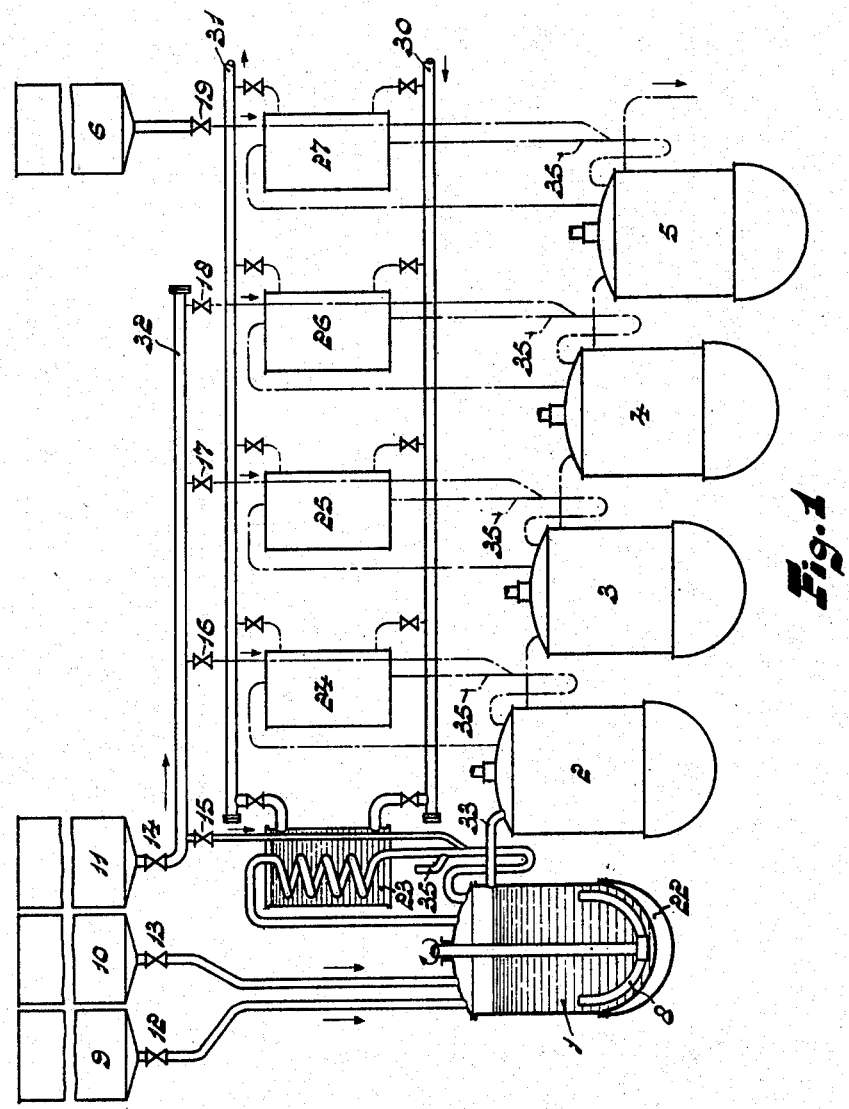

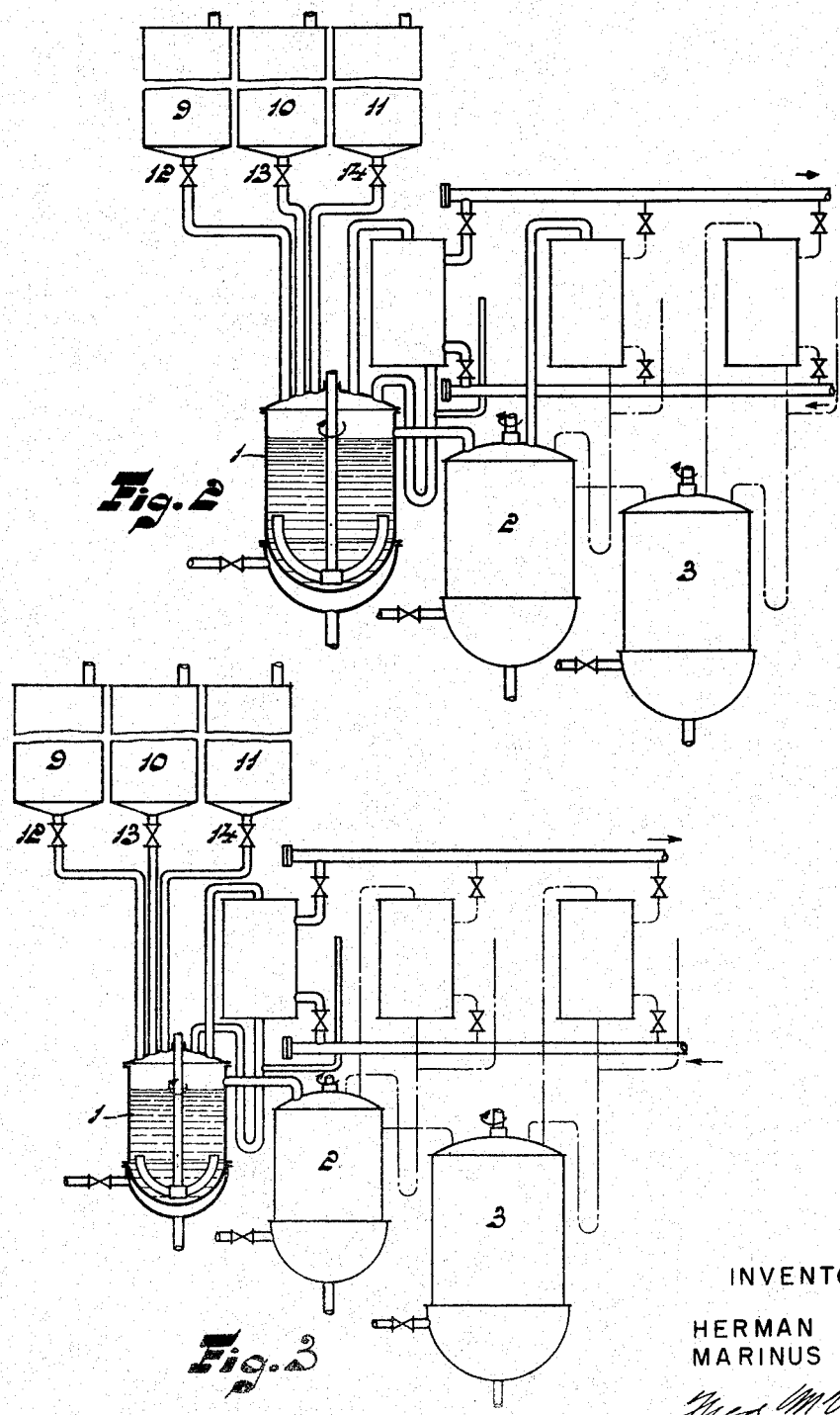

Patented Nov. 4, 1952

2,616,872

UNITED STATES PATENT OFFICE 2,616,872

METHOD OF PRODUCING NOVOLAKS

Herman Bloem and Marinus Stel, Eindhoven, Netherlands, assignors to Hartford National Bank and Trust Company, Hartford, Conn., as trustee Application March 1, 1951, Serial No. 213,412
In the Netherlands March 14, 1950

4 Claims. (Cl. 260—54)

This invention relates to methods of producing novolaks from phenol and formaldehyde with the use of a catalyst. The term "phenol" is to be understood here to mean not only monohydroxybenzene, but also suitable homologues thereof such as cresol and xylenol and polyvalent phenols, for example, resorcin. Such novolaks, which are not of themselves capable of solidifying, are usually produced by mixing in a reaction vessel measured quantities of phenol and formaldehyde together with a catalyst in a suitable molecular ratio and by causing them to react, the phenol always being present in excess. After the reaction, the condensation products are removed from the reaction vessel and worked up. Formaldehyde is usually added as a solution in water. The catalyst may consist of acids or alkalis. Reaction may be effected in a continuous manner i. e. a continuous stream of reaction components may be supplied to a reaction apparatus to leave the latter as a continuous stream of end-condensation product from which the novolaks are obtained by expelling any water and catalyst.

It has been proposed to produce phenolformaldehyde condensation products in a continuous manner by causing a stream of liquid, wherein phenol, formaldehyde and catalyst are mixed in a desired ratio, to react whilst this mixture is passing through a tubular reaction vessel. However, this and similar methods, in which the condensation reaction is effected continuously in a single reaction vessel, suffers from the limitation that gelatinisation often occurs as a result of which the contents of the apparatus become a gelatinized mass and the reaction is hence disturbed, more especially if phenol and formaldehyde condense in a ratio which is low.

It has now been found that the said limitation does not occur if the condensation reaction is divided over a sufficient number of series-connected reaction vessels through which a reaction mixture passes continuously, the phenol and formaldehyde being supplied continuously in the desired ratio to the first reaction vessel and the condensation reaction process being divided over a number of reaction vessels such that gelatinisation does not occur.

It is pointed out that in a continuous method of producing novolaks there is a risk that the condensation products formed may react excessively with formaldehyde, which may involve an unduly high concentration of high-molecular condensation products in the end-reaction product, thus causing gelatinisation. If the condensation reaction tends to take place rapidly at the beginning of the process and then gradually more slowly, which may be undesirable in view of a suitable distribution thereof over a number of reaction vessels, the rate of reaction is adjusted in connection with the time during which the condensing mixture stays in each reaction vessel such that the condensation in each reaction vessel takes place for the desired part. In this case, gelatinisation will not occur if a sufficient number of reaction vessels is chosen in connection with the ratio between phenol and formaldehyde.

The time of staying in a reaction vessel is to be understood to mean in the steady state of the process, the ratio between the content of the reaction vessel and the volume supplied thereto per unit time.

As is known, the rate of condensation depends both upon the nature and upon the concentration of the catalyst in the condensing mixture as well as upon the temperature.

Consequently, the condensation reaction may proceed at a constant temperature in a series of reaction vessels of equal size if the supply of catalyst to each vessel is measured such that a desired part of the condensation reaction takes place during a predetermined stay in each reaction vessel. Alternatively, the catalyst together with the reaction components may pass successively through all reaction vessels and by adjusting the temperature of each individual reaction vessel the condensation reaction may take place therein for the desired part.

A further alternative is to cause the reacting mixture to stay for a shorter or longer time in each individual reaction vessel by a suitable choice of the size of the reaction vessels.

These methods of distributing the condensation reaction process over a number of reaction vessels may be combined, for example, by distributing the supply of catalyst over several reaction vessels and by varying the size of the remaining reaction vessels so as to ensure the desired division of the condensation reaction.

According to the present invention, a method of producing novolaks in a continuous manner from phenol and formaldehyde with the use of a catalyst, according to which a continuous stream of phenol and formaldehyde is introduced into a reaction installation from which the end-condensation product is carried off continuously, is characterized in that the reaction installation comprises a number of series-connected reaction vessels through which the reacting liquid mixture passes successively, the rate of condensation of the reaction components being adjusted, in connection with the time of staying in the reaction vessels, by adjustment of the temperature, of the catalyst concentration in each individual reaction vessel, by a suitable size of each individual reaction chamber or by a combination of these expedients, in such manner that the condensation reaction takes place for a desired part in each reaction vessel.

The optimum result is obtained by causing the condensation reaction process to take place as evenly as possible, so that an equal or approximately equal part of the condensation reaction takes place in each reaction vessel. In this case, in order to prevent gelatinisation, the number of reaction chambers may be smaller than if the reaction process were distributed arbitrarily over the reaction vessels.

The number of reaction vessels should, of course, not be less than the minimum number required to prevent gelatinisation. This depends upon the nature of the phenol used and upon the ratio in which phenol and formaldehyde react. When using a reacting mixture of monohydroxybenzene and formaldehyde combining with 0.70 mol. formaldehyde per mol. of added monohydroxybenzene, two reaction vessels are sufficient. If, however, 0.80 mol. formaldehyde is used per mol. monohydroxybenzene added, at least four reaction vessels are necessary, at least ten reaction vessels being required if the ratio is 1 to 0.86. When producing novolaks from a commercial cresol mixture containing 50 to 55% by weight of metacresol in a molecular ratio of 1 mol. added cresol to 0.70 mol. formaldehyde, eight reaction vessels are necessary.

In order that the production process may proceed expeditiously, it is essential that the reaction liquid in each reaction vessel, particularly if this liquid consists of two liquid phases, should be maintained in a sufficiently mixed condition to prevent the resin from settling, e. g. by stirring. Furthermore, the reaction conditions should preferably not be altered during the process, so that stationary conditions are established in the reaction vessels, which means that the composition of a reaction mixture will invariably be substantially the same at the same point in the installation and discrepancies in the final product are greatly reduced.

In order that the invention may be more clearly understood and readily carried into effect, it will now be described more fully with reference to the accompanying diagrammatic drawings, given by way of example.

Example I

Fig. 1 shows a test installation comprising uniform reaction vessels 1 to 5, the vessel 1, wherein the agitator 8 provides suitable mixing, being shown in longitudinal section. The remaining reaction vessels 2 to 5 also comprise agitators. If required, heating may be effected by introducing steam into a double bottom 22. Vapours produced are condensed in the coolers 23 to 27. Inlet and outlet pipes for cooling water 30 and 31, respectively, are provided. Through pipes 35 the reaction vessels communicate with the open air.

From a supply vessel 9, 302 ccs. of a solution containing 92 gms. of monohydroxybenzene per 100 ccs. are caused to flow per hour into the reaction vessel 1. From a similar supply vessel 10, 198 ccs. of formalin flow per hour into the reaction vessel 1. The reaction vessels have a volume of 200 ccs. of which 135 ccs., i. e., the volume below the level of connecting pipe 33, are used effectively. The vessels are heated to 98° C. and their contents stirred vigorously. Supply vessel 11 contains 0.29 n sulphuric acid which is passed through a distributing tube 32 to the reaction vessels 1 to 4 in quantities regulated by cocks 15 to 18, namely

| | Ccs. per hour |
|---|---|
| To reaction vessel 1 | 9.4 |
| To reaction vessel 2 | 10 |
| To reaction vessel 3 | 8.3 |
| To reaction vessel 4 | 9.3 |

The rates of flow from the vessels 9, 10 and 11 are regulated by means of cocks 12, 13 and 14.

140 ccs. of 25% sulphuric acid flow per hour from a supply vessel 6 into reaction vessel 5, which quantity may be adjusted by a cock 19.

After steady conditions had been established in all the reaction vessels, it proved that in reaction vessel 1 22% of the added formaldehyde had combined, in the vessel 2 14%, in vessel 3 18%, in vessel 4 26% and in vessel 5 12%. Of the added formaldehyde 8% did not combine, so that every 10 mol. phenol passed through the reaction apparatus were reacted with 7.9 mol. formaldehyde.

Example II

Fig. 2 shows a test installation comprising supply vessels 9, 10 and 11 containing a resorcin solution containing 55.3 gms. of resorcin per 100 ccs. a formalin solution having a formaldehyde content of 39.6 gms. per 100 ccs. and a 0.46 n potassium hydroxide solution, respectively.

Of these solutions 415 ccs., 79.4 ccs. and 40.0 ccs., respectively flow per hour into reaction vessel 1, which quantities are regulated by means of cocks 12, 13 and 14. This mixture, which reacts partly in the reaction vessel 1, subsequently passes through the reaction vessels 2 and 3. In reaction vessel 1, the temperature of the reacting mixture is adjusted to 43° C. by heating with the use of the double bottom. The temperatures of the second and third reaction vessels are adjusted to 60° C. and 98° C., respectively. After the stable conditions had been established in all the reaction vessels, the formaldehyde proved to have combined completely. This was also the case, if condensation took place only in the third vessel, but then gelatinisation of the reaction mixture soon occurs.

Example III

Three series-connected reaction vessels 1 to 3 in Fig. 3, which have an effective content of 30, 50 and 135 ccs., respectively, are traversed, similarly as in Example II, by a reaction mixture initially composed of a resorcin solution having a resorcin content of 55.3 gms. per 100 ccs. from a supply vessel 9, formalin having a formaldehyde content of 39.6 gms. per 100 ccs. from a supply vessel 10 and 2 n caustic soda solution from a supply vessel 11, supplied in quantities of 342 ccs., 80 ccs. and 111 ccs. per hour, respectively, to a reaction vessel 1, the temperature of the reaction vessels being adjusted to 98° C.

In this manner, a resorcin novolak is obtained with the use of 6.2 mol. formaldehyde per 10 mol. resorcin. When this test was repeated, likewise with three reaction vessels but each having a content of 135 ccs. gelatinisation of the mixture soon occurred.

What we claim is:

1. A continuous process for preparing novolaks which comprises the steps of continuously introducing streams of a phenol and formaldehyde in a predetermined ratio and a catalyst into a first reaction vessel filled to a predetermined level with an intimate mixture of reaction components and reaction products resulting from the reaction of the phenol, the formaldehyde, and the catalyst, continuously withdrawing a stream of the reaction mixture in the first vessel equal in volume to the streams of the reaction components entering the first vessel, continuously introducing the stream being withdrawn from the first vessel into a second vessel filled with a reaction mixture in a more advanced stage of condensation, mixing the second stream with the reaction mixture in the second vessel, continuously withdrawing a stream of the reaction mixture in the second vessel equal in volume to the stream entering the second vessel, and successively continuously introducing, mixing, and withdrawing equal volumes of reaction mixtures in succeeding vessels until the reaction is substantially completed without gelatinizing the mixture in any vessel.

2. A process as claimed in claim 1 in which a stream of catalyst is introduced into the second and succeeding reaction vessels.

3. A process as claimed in claim 1 in which the reaction mixture in successive vessels is maintained at a higher temperature.

4. A process as claimed in claim 1 in which the volume of reaction mixture in successive is greater than the volume of reaction mixture in the next preceding vessel.

HERMAN BLOEM.
MARINUS STEL.

REFERENCES CITED

The following references are of record in the file of this patent:

UNITED STATES PATENTS

| Number | Name | Date |
|---|---|---|
| 1,660,403 | Turkington | Feb. 28, 1928 |
| 2,456,192 | Houlton | Dec. 14, 1948 |

OTHER REFERENCES

Brothman: Chemical and Metallurgical Engineering, March 1943, pages 108–112.